US012750447B2

(12) United States Patent
Katti et al.

(10) Patent No.: US 12,750,447 B2
(45) Date of Patent: Sep. 29, 2026

(54) SYSTEMS AND METHODS FOR AUTOMATED CONTACT CENTER MANAGEMENT BASED ON ANALYSIS OF AGENT STATE

(71) Applicant: RingCentral, Inc., Belmont, CA (US)

(72) Inventors: Vadiraj Katti, Pleasanton, CA (US); Ashish Seth, Los Altos, CA (US)

(73) Assignee: RingCentral, Inc., Belmont, CA (US)

( * ) Notice: Subject to any disclaimer, the term of this patent is extended or adjusted under 35 U.S.C. 154(b) by 146 days.

(21) Appl. No.: 18/756,627

(22) Filed: Jun. 27, 2024

(65) Prior Publication Data

US 2026/0006130 A1 Jan. 1, 2026

(51) Int. Cl.
*H04M 3/523* (2006.01)
*H04M 3/51* (2006.01)

(52) U.S. Cl.
CPC ....... *H04M 3/5232* (2013.01); *H04M 3/5175* (2013.01); *H04M 3/5191* (2013.01)

(58) Field of Classification Search
CPC ............. H04M 3/5232; H04M 3/5175; H04M 3/5191; H04M 3/523; H04M 3/51; G06Q 10/06311
See application file for complete search history.

(56) References Cited

U.S. PATENT DOCUMENTS

| | | | | |
|---|---|---|---|---|
| 10,728,392 | B1 * | 7/2020 | Chandrakant | H04L 67/54 |
| 2009/0290700 | A1 | 11/2009 | Omiya | |
| 2017/0104872 | A1 * | 4/2017 | Ristock | H04M 3/523 |
| 2022/0067630 | A1 | 3/2022 | Asokan et al. | |
| 2024/0214493 | A1 * | 6/2024 | Mouslmani | G06Q 10/06311 |

* cited by examiner

*Primary Examiner* — Yosef K Laekemariam
(74) *Attorney, Agent, or Firm* — Ansari Katiraei LLP; Arman Katiraei; Sadiq Ansari

(57) ABSTRACT

A contact center controller is provided to automatically manage a large volume of audio and/or video electronic communications in a contact center. The controller routes electronic communications to available agents, and monitors the interactions between the agents and users participating in the electronic communications. The controller determines a state associated with each agent based on the interactions the agent has with one or more users in the same electronic communication, and routes new electronic communications away from a first agent in response to determining a first state for the first agent that indicates a specific level of fatigue. The controller performs different actions for different agents and/or electronic communications based on different or changing levels of fatigue associated with the agents.

20 Claims, 9 Drawing Sheets

SYSTEMS AND METHODS FOR AUTOMATED CONTACT CENTER MANAGEMENT BASED ON ANALYSIS OF AGENT STATE

TECHNICAL FIELD

The present disclosure relates to the field of audio and video communications.

BACKGROUND

Contact centers have a changing roster of live agents that communicate with third-party users for sales, support, inquiry, and other purposes. The number of live agents that are active at a contact center on a given day and time may be based on historic contact volume for that day and time.

Unforeseen or unexpected circumstances may cause the contact volume to suddenly surge and overwhelm the live agents. The sudden surge may overwhelm, exhaust, and/or fatigue the live agents due to the increased pressure and stress associated with the increased contact volume. Agent fatigue may also be accelerated or exacerbated when a live agent is disproportionately engaged with angry or upset users, is repeatedly engaged in the same type of call, is repeatedly answering the same questions, or is repeatedly discussing the same topics.

Fatigued agents become less effective and less productive. For instance, a fatigued agent may be slower to resolve an issue, may provide incorrect or flawed assistance, or may be less willing to sympathize or calmly accept user complaints or user anger than a fresh agent at the start of a shift.

As a result, fatigued agents may negatively impact user satisfaction, reduce productivity, and/or harm the business in various ways. Moreover, a constantly fatigued agent is more likely to leave their position which then causes the business to spend time and resources to train new agents. Accordingly, there is a need for automatic detection of agent state and remediation of detected issues including agent fatigue. More specifically, there is a need for automated systems and methods that improve user satisfaction, agent effectiveness, and business productivity across a contact center by preventing agent fatigue before it happens or by performing different automated actions based on agents experiencing different levels of fatigue.

DETAILED DESCRIPTION OF PREFERRED EMBODIMENTS

Figure 1:
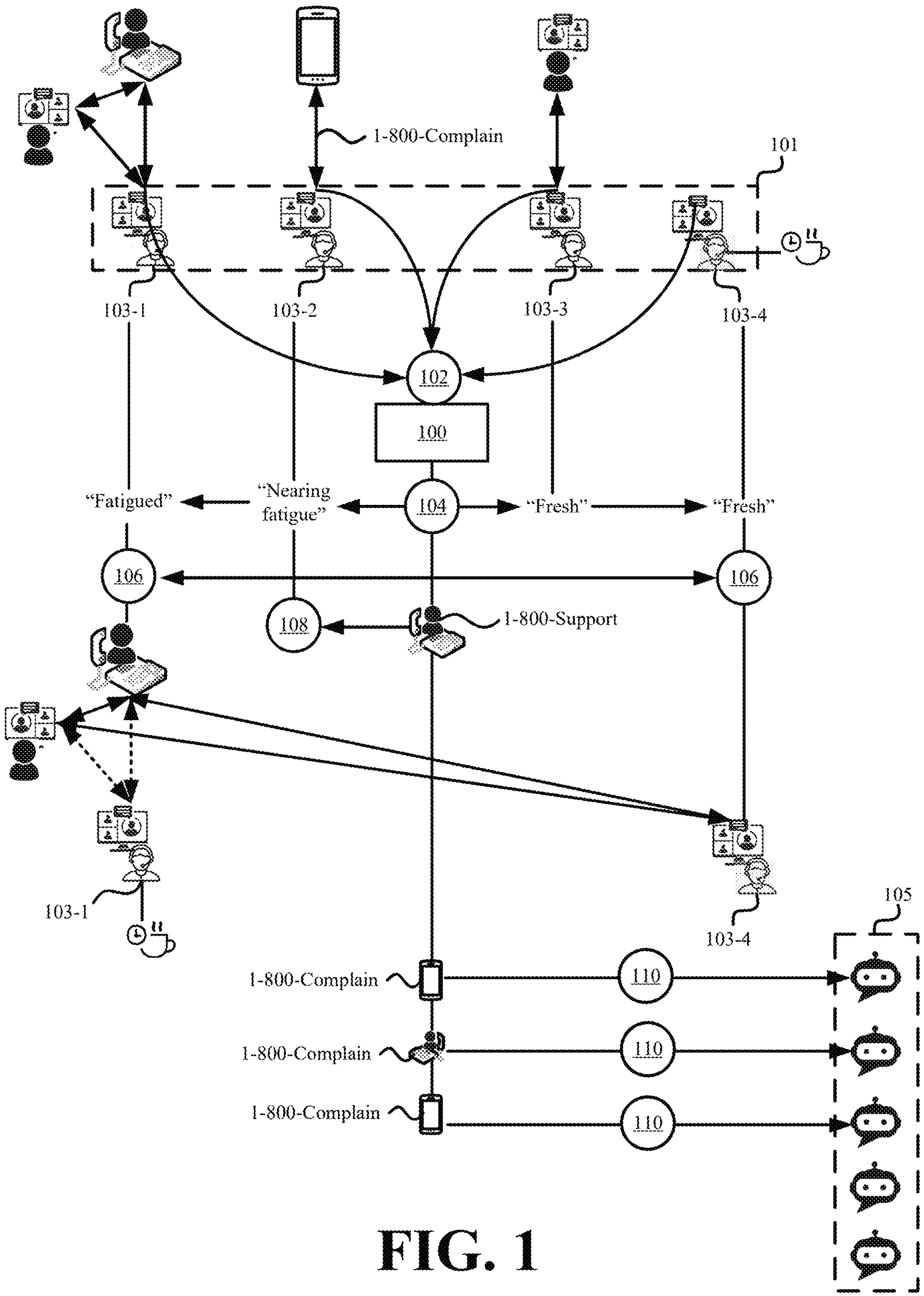
FIG. 1 illustrates an example of automating the management and control of a contact center in accordance with some embodiments presented herein.

This disclosure arises from the realization that agents at different states of fatigue in a contact center are less effective at their roles than fresh agents and that agents at different states of fatigue increase costs and expenses for the organization. For instance, fatigued agents in the contact center may deviate from best practices, have less patience, and become more likely to provide incorrect answers. As a result, the organization may lose business and may experience higher turnover which increases organizational costs for hiring and training new agents.

Manual monitoring of agent fatigue is imprecise and nearly impossible for supervisors. Supervisors are simply unable to listen to every agent interaction or observe every agent in the contact center at all times.

The disclosure also arises from the realization that organizations are ill prepared for sudden changes in contact volume and are often too slow to deploy additional resources to deal with the sudden changes. For instance, in the event of a sudden contact volume surge, there is often no recourse other than to overwhelm the available agents with the contact volume surge. The changes in contact volume may occur for a single form of electronic communication conducted by the agents or across different forms of electronic communication. For instance, the agents in the contact center may receive a surge in telephone calls, audio and/or video conference requests, text-based chats, instant messaging, email support, and/or other electronic communications.

The current disclosure provides a technological solution for a technological problem in the fields of audio and/or video communication. More specifically, the current disclosure provides a technical solution to the technical problem of monitoring, routing, and/or otherwise managing a large volume of audio and/or video communications in a contact center.

The technological solution introduces real-time systems and methods that monitor agent interactions in the contact center, monitor external influences that may affect the number of user interactions with the contact center, ascertain agent state as measures of fatigue based on the monitored interactions and external influences, and perform automated actions to assist agents at different declining states and/or prevent further state decline. For instance, the systems and methods may automatically route inbound communications (e.g., calls, conferences, chat sessions, etc.) across the available agents based on a monitored level of fatigue in order to reduce loads or provide a temporary respite to fatigued agents so that the effectiveness of the agents is maintained throughout their respective shifts. Consequently, overall user and agent satisfaction is increased. Increased user and agent satisfaction may lead to reduced agent turnover and increased profitability and/or productivity.

The technological solution incorporates autonomous bots in order to dynamically scale resources of the contact center and seamlessly transition or route the contacting users between live agents and the autonomous bots when there is a shortage of live agents or fresh agents. The technology solution ensures that the contacting users are not waiting extended periods of time for assistance and are provided effective assistance when they contact the contact center. The technological solution provides near unlimited scalability of the contact center so that the contact center is able to dynamically adapt to unforeseen or unexpected surges in contact volume as well as to different rates or times at which different agents fatigue.

The technological solution uses artificial intelligence and/or machine learning (AI/ML) for predictive contact center management. The AI/ML techniques account for more than just historic or past contact center volume in determining the number of live agents that are needed to handle the expected future contact center usage or volume. The AI/ML techniques track the different rates at which each individual agent's state changes, the causes for each state change, and the impact that each detected cause has on a state change. Moreover, the AI/ML techniques model an impact that different external influences or events may have on future contact volume.

The predictive contact center management includes automatically scheduling an optimal mix of different live agents based on the tracked agent state changes and the modeled impact of detected external influence or events. The optimal mix of different live agents minimizes the number of live agents needed to handle the predicted contact volume for future shifts, thereby minimizing the potential of the contact center having to respond to an unforeseen or unexpected surge and the negative impact that such a surge has on user satisfaction, accelerating agent fatigue, and business productivity.

FIG. 1 illustrates an example of automating the management and control of a contact center in accordance with some embodiments presented herein. Contact center 101 may correspond to one or more locations with live agents 103 performing sales, support, outreach, assistance, and/or other tasks involving direct and/or live communication with the third-party users. As such, contact center 101 may include dialers, conferencing devices, and/or conferencing applications that provide telephony services (e.g., Plain Old Telephone Services (POTS)) or network-based communications (e.g., Internet or network-based audio and/or video conferencing). Contact center 101 may support voice-only communications or voice and video communications (e.g., video conferencing solutions). Additionally, contact center 101 may support text-based communications (e.g., instant messaging, text messaging, email, etc.) between the dialers, conferencing devices, and/or conferencing applications used by live agents 103 and the devices of the third-party users. At any given time, contact center 101 may support tens, hundreds, or thousands of active electronic communications between the live agents and the third-party users.

Contact center controller 100 receives (at 102) streams of electronic communications between different third-party users and live agents 103-1, 103-2, 103-3, and 103-4 (collectively referred to as "live agents 103" or individually as "live agent 103") of contact center 101. The electronic communications may include calls, conferences, conversations, chats, meetings, and/or other communications that are established or otherwise conducted between devices of the third-party users and live agents 103.

Contact center controller 100 determines (at 104) the state of each live agent 103 based on an analysis of current electronic communications and/or past completed electronic communications by the same live agent 103. The agent state corresponds to a measure of fatigue as represented through a multitude of state parameters including the agent's energy level, tone, politeness or rudeness, emotional state, active or passive listening, stress indicators, word usage, informational accuracy, repeated dialog or topics, time of day, time since last break, workload, and/or agent behaviors. User satisfaction may also contribute or impact the measure of agent fatigue. For instance, the determination (at 104) of agent state may include increasing the level of fatigue associated with the agent in response to the other users or participants in the electronic communication expressing anger, frustration, displeasure, boredom, and/or other negative emotions or dissatisfaction. Contact center controller 100 may determine (at 104) a first state for first live agent 103-1 that is indicative of a fatigued agent, a second state for second live agent 103-2 that is indicative of an agent nearing fatigue, and a third state for third live agent 103-3 and for fourth live agent 103-4 that is indicative of a fresh agent.

In response to determining (at 104) the first state for first live agent 103-1, contact center controller 100 performs (at 106) automated actions that assist first live agent 103-1 with their active electronic communication and that prevent first live agent 103-1 from further fatigue. The automated actions include handing over or transferring the electronic communication from first live agent 103-1 to available and/or idle fourth live agent 103-4 since the third state associated with fourth live agent 103-4 indicates fourth live agent 103-4 is not fatigued and therefore likely to be more effective in addressing the user issues in the electronic communication. In some example embodiments, contact center controller 100 may display a prompt, notification, or message on a display of the devices used by first live agent 103-1 and fourth live agent 103-4 to initiate the electronic communication transfer. In some such example embodiments, contact center controller 100 may monitor the stream of the electronic communication for keywords that are spoken or entered by first live agent 103-1 (e.g., "Let me transfer you to my supervisor"), and in response to detecting the keywords, contact center controller 100 transfers the electronic communication to fourth live agent 103-4. Alternatively, contact center controller 100 may notify a supervisor to assist first live agent 103-1, and may automatically connect the supervisor to the electronic communication. Once first live agent 103-1 exits the electronic communication, contact center controller 100 may notify first live agent 103-1 that they are being provided a break and will not be receiving any new electronic communications for a period of time while first live agent 103-1 is on the break. Contact center controller 100 avoids routing new electronic communication to first live agent 103-1 for the identified period of time.

In response to determining (at 104) the second state for second live agent 103-2, contact center controller 100 performs (at 108) different automated actions that reduce the rate of fatigue or prevent second live agent 103-2 from further fatigue. In some example embodiments, contact center controller 100 may determine that second live agent 103-2 fatigue was caused by second live agent 103-2 receiving the same type of call, repeatedly addressing the same set of issues, or answering the same set of questions in the last set of electronic communications routed to or received by second live agent 103-2. In some such example embodiments, the automated actions may include changing the type of electronic communication that is next routed to second live agent 103-2. For instance, contact center controller 100 may have routed five consecutive electronic communications that were made to a customer complaint number to second live agent 103-2, and performing (at 108) the different automated actions may include routing an electronic communication that is made to a customer support number to second live agent 103-2 as a next electronic communication.

Contact center controller 100 may make no change in the electronic communications that are routed to third live agent 103-3 in response to determining (at 104) the third state (e.g., not fatigued) for third live agent 103-3. However, contact center controller 100 may receive electronic communications from third-party users that exceed the current capacity of contact center 101. Rather than route a new electronic communication to the fatigued first agent 103-1 and interrupt the break that was dynamically provided to relieve first agent 103-1, contact center controller 100 may scale the contact resources of contact center 101 by activating (at 110) one or more bots 105 to handle the excess contact volume until agents 103 at acceptable states are available to accept the excess contact volume. In other words, bots 105 may operate in combination with active live agents 103-2, 103-3, and 103-4 to respond in real-time to the contacting third-party users so that the third-party users are not placed on long holds that increase user dissatisfaction before even starting an electronic communication.

In some example embodiments, contact center controller 100 may provide contacting third-party users with the option of being contacted at a later time when the volume of electronic communications exceeds the current capacity of contact center 101. For instance, contact center controller 100 may play a recording or present a prompt asking a third-party user if they would like to be contacted within a specified period of time when the contact volume is expected to subside or when an agent 103 is expected to be available. Contact center 101 may receive a telephone number, messaging handle, email address, or other form of contact, and may enter the information in a queue for agents 103.

Figure 2:
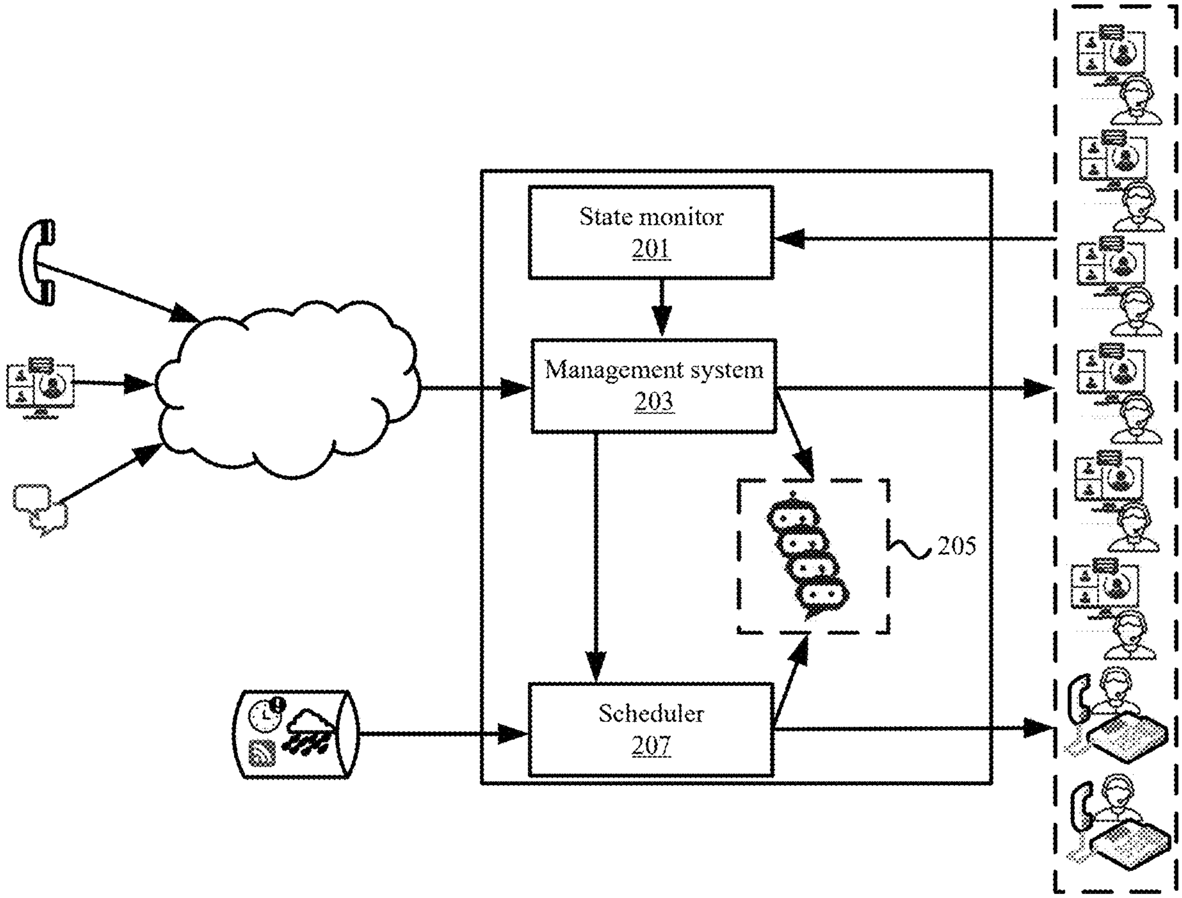
FIG. 2 illustrates an example architecture for a contact center controller in accordance with some embodiments presented herein.

FIG. 2 illustrates an example architecture for contact center controller 100 in accordance with some embodiments presented herein. Contact center controller 100 may include state monitor 201, management system 203, bots 205, scheduler 207, and/or other components that execute on or are implemented with one or more devices or machines having processing, memory, storage, network, and/or other hardware resources for automated management of inbound and outbound electronic communications with the live agents of a contact center. In some example embodiments, contact center controller 100 manages the electronic communications by controlling the routing of calls and conferences between the live agents of the contact center and the third-party users, controlling the live agents schedules, activating and deactivating autonomous bots (e.g., chatbots that communicate with machine-generated audio or with machine-generated text), and/or performing other automated actions for agent fatigue remediation.

State monitor 201 may be configured to receive the audio and/or video streams of each established or active electronic communication between a live agent of the contact center and one or more third-party users. State monitor 201 may also receive an identifier that identifies the live agent that participates in each received stream. The identifier may correspond to a network address of the dialer, conferencing application, or communication device that is used by the live agent or that the live agent has logged into. State monitor 201 may associate the network address to the live agent based on a tracked association between the dialer, conferencing application, or communication device identified by that network address and the live agent assigned to the identified dialer, conferencing application, or communication device or based on the identified login.

State monitor 201 analyzes the streams to determine the state of the live agent identified to be participating in each stream. Moreover, state monitor 201 may track each agent's last state and update the state based on an analysis of a current stream involving the same agent. In some example embodiments, state monitor 201 uses AI/ML techniques to determine the electronic communication parameters that have a greater or lesser impact on each agent state, and to develop trends for the different rates and causes by which each agent state changes. For instance, the AI/ML techniques may detect a first set of state parameters (e.g., repetitive conversation topics and early morning shifts) in electronic communications conducted by a first agent that caused the first agent to fatigue or change between different states at a first rate, and may detect a different second set of state parameters (e.g., berating users and excessive contact volume) in electronic communications conducted by a second agent that caused the second agent to fatigue or change between different states at a second rate.

Management system 203 receives the agent states from state monitor 201, and implements various automated actions in response to the different states corresponding to different levels of fatigue. The automated actions may include providing an agent a break by temporarily routing electronic communications to other agents, mixing the types of electronic communications that are routed to an agent to prevent the agent from repeatedly responding to the same type of electronic communications, providing assistance to an active electronic communication that the agent is engaged in by bringing in another agent, supervisor, or bot 205 to participate in the active electronic communication with the agent or by handing over the active electronic communication to another agent, supervisor, or bot 205, and/or controlling the activation and deactivation of bots 205 to receive or handle repetitive parts of an electronic communication (e.g., information gathering) or relieve the agents from excess contact volume.

Bots 205 may include chatbots, digital assistants, and/or other devices or systems that interact with the third-party users using machine-generated audio or machine-generated text that simulates a live agent. Bots 205 may be trained based on recordings of a sample set of electronic communications. AI/ML techniques and/or language learning models (LLMs) may extract optimal responses to specific user inquiries and/or develop scripts or flows for guiding different types of electronic communications according to best practices that are modeled from the sample set of electronic communications.

Scheduler 207 automatically allocates the contact center resources for future shifts or dates to minimize the likelihood of the contact center being understaffed or the agents in any particular shift reaching undesired states as a result of excess contact volume. Scheduler 207 may use the individual agent states from state monitor 201, a predicted volume surge associated with the external events that have occurred or that are expected to occur, the historic or past contact center volume, and/or other factors to schedule an optimal mix of different live agents for the future shifts or dates. The optimal mix of different live agents includes a number of live agents to handle the predicted contact volume for the future shifts or dates without becoming overwhelmed or reaching undesired states of fatigue with the predicted contact volume accounting for a risk of a sudden contact volume spike, and with the number of live agents including a set of agents that fatigue at different rates to avoid a disproportionate number of agents needing relief or assistance at the same time.

Figure 3:
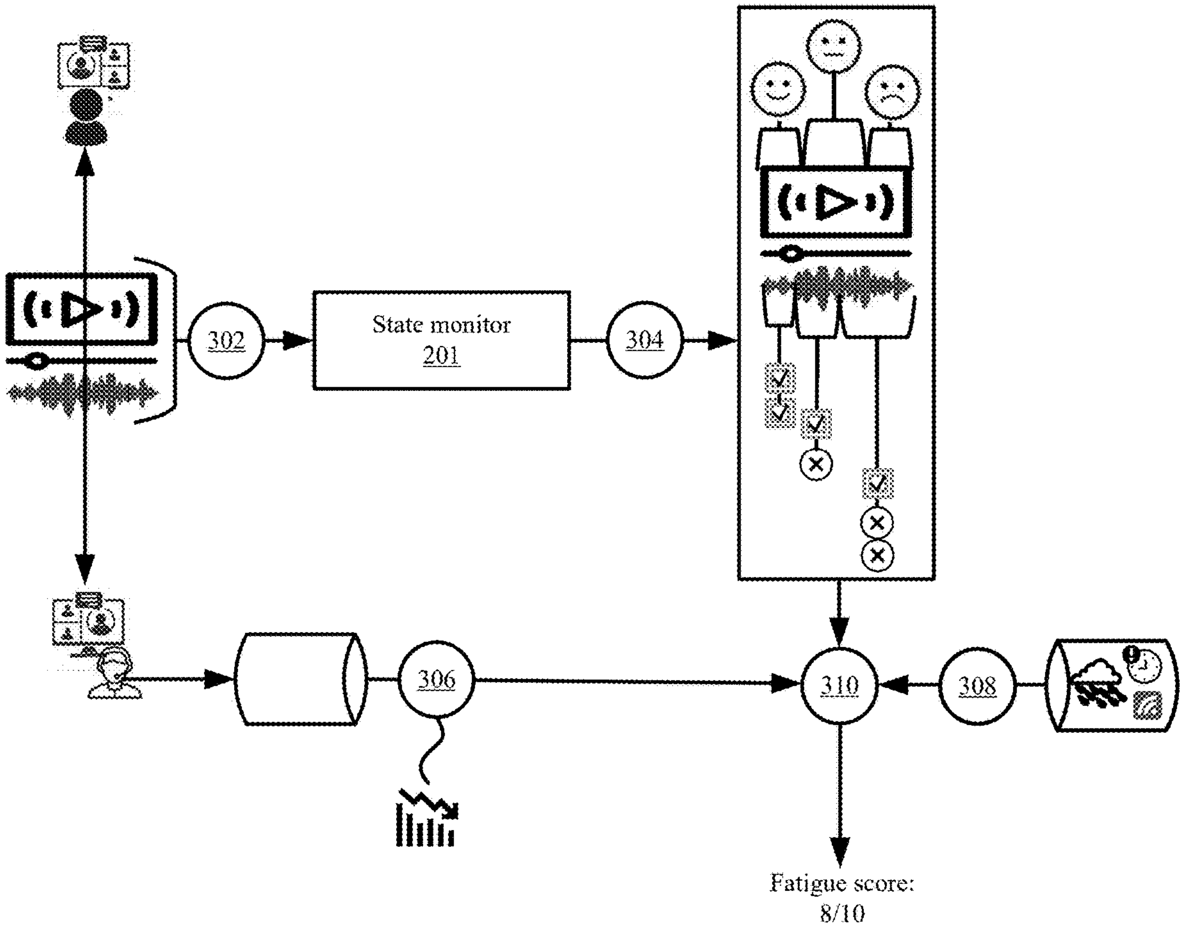
FIG. 3 illustrates an example of determining agent state in accordance with some embodiments presented herein.

FIG. 3 illustrates an example of determining agent state in accordance with some embodiments presented herein. State monitor 201 determines agent state from multiple signals or indicators within the audio and/or video streams of an electronic communication. Accordingly, state monitor 201 receives (at 302) the audio and/or streams for all participants in the electronic communication.

State monitor 201 performs (at 304) a real-time behavioral analysis of the received (at 302) streams. In some example embodiments, performing (at 304) the real-time behavioral analysis includes detecting different signals or indicators of agent fatigue based on speech that is captured in the audio streams and images of the participants that are captured in the video streams.

The behavioral analysis includes analyzing agent behavioral characteristics based on the speaker tone (e.g., compassionate, apathetic, happy, angry, interested, bored, shouting, calm, agitated, etc.) in the received audio stream, word usage (e.g., polite, combative, frustrated, understanding, etc.), energy level (e.g., lethargic, enthusiastic, etc.), conversational etiquette (e.g., listening, interrupting, argumentative, etc.), discussed topics, amount of provided information, accuracy of answers to questions, and/or other factors indicative of the agent and user behavior during the electronic communication. The agent behavioral characteristics may also include participant expressions throughout the video. For instance, over a first part of the electronic communication, state monitor 201 detects a calm speaker tone, polite word usage, and an engaged or enthusiastic energy level between participants. Over a second part of the electronic communication, state monitor 201 detects a shift from the calm speaker tone to a frustrated speaker tone based on changes in the speakers' pitch and speaking rate and usage of words indicating frustration or anger. Over a third part of the electronic communication, state monitor 201 detects an argumentative speaker tone, repetitive questions being asked, and incorrect answers being provided by the agent.

State monitor 201 may also retrieve (at 306) state history tracked for the live agent. The state history may include signals or indicators of agent fatigue extracted from electronic communications in live agent's current shift. The state history may also track different factors that were previously determined to contribute to the live agent's changing state and the rate or impact that each factor has on the agent state. For instance, a first live agent may fatigue more quickly or at a first rate when repeatedly responding to a particular type of electronic communication or questions, while a second live agent may not fatigue when repeatedly responding to the same particular type of electronic communication or questions. Instead, state monitor 201 may determine from previous monitoring of the second live agent that the second live agent may fatigue at a different second rate after completing a specific number of electronic communications in a day or shift.

Other variables or parameters that may affect the agent state determination include the day-of-week, the time-of-day, the amount of time elapsed since the start of the agent's shift or the agent's last break, and/or the duration that the agent has been employed. For instance, an agent is less likely to become fatigued or less likely to fatigue at an accelerated rate at the start of a shift or after returning from a break, and is more likely to become fatigued or more likely to fatigue at the accelerated rate at the end of a shift or when nearing a break time.

State monitor 201 may also identify (at 308) external events that may increase or decrease the contact volume, and therefore have the potential to accelerate or decelerate agent fatigue. The external events may include weather, traffic, news, financial, social media events, social media trending topics (e.g., viral posts), and/or other data that is crowd-sourced or obtained from external sources. For instance, when the contact center provides customer support for a travel or transportation company (e.g., an airline), the weather events may cause travel cancellations and delays which create an increase in contact volume from affected and/or angry customers.

State monitor 201 may use one or more AI/ML techniques to classify (at 310) agent state based on the signals and indicators detected during the behavioral analysis, the agent's state history, time variables or parameters, and/or the external events. In some example embodiments, the AI/ML techniques classify (at 310) the agent state according to state predictive models that associate different groups of the state inputs (e.g., signals, indicators, external events, time variables, etc.) with different agent states. In some such example embodiments, the state predictive models are generated by neural networks that receive a set of sample electronic communications as training data and that identify repeating groups of state inputs that precede or occur a particular agent state in the set of sample electronic communications with a threshold percentage or likelihood.

In some example embodiments, agent state may be quantified as "not fatigued", "nearing fatigue", and "fatigued". In some other example embodiments, agent state may be quantified with more or less classifiers or according to different numeric scales (e.g., 0-10 with 0 corresponding to a measure of no fatigue and 10 corresponding to a measure of absolute or total fatigue).

Figure 4:
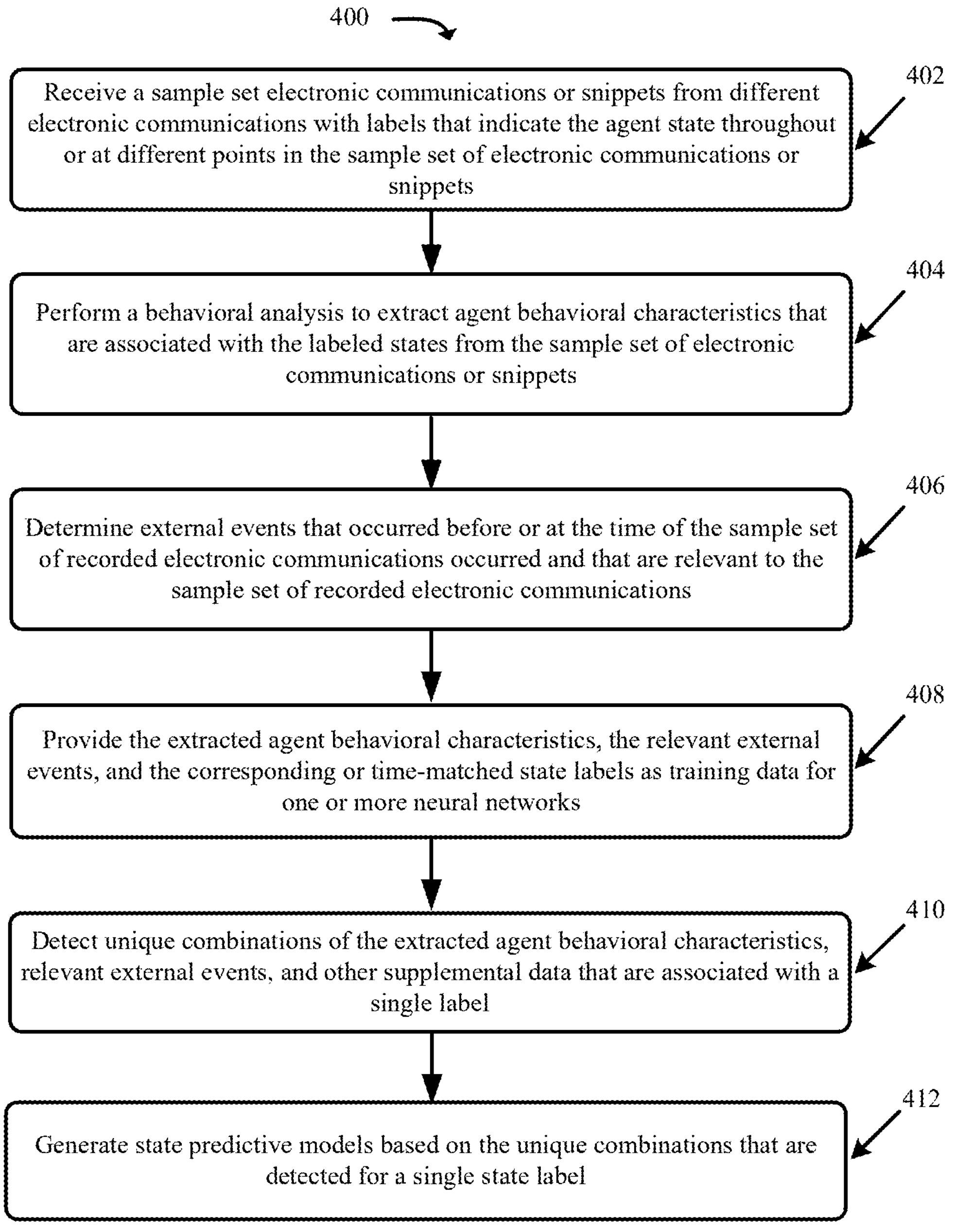
FIG. 4 presents a process for training the state predictive models from which agent state is determined in accordance with some embodiments presented herein.

FIG. 4 presents a process 400 for training the state predictive models from which agent state is determined in accordance with some embodiments presented herein. Process 400 may be implemented by state monitor 201 for all agents in a contact center or may be implemented to train the state predictive models for detecting state changes on an individual agent basis. In some example embodiments, process 400 is continually executed in order to improve the state predictive model accuracy and the association between different state inputs and different agent states.

Process 400 includes receiving (at 402) a sample set of recorded electronic communications or snippets from different electronic communications with labels that indicate the agent state throughout or at different points in the sample set of recorded electronic communications or snippets. The sample set of recorded electronic communications or snippets are used as the input data for training the state predictive models and as examples of the behavioral indicators or signals that represent or coincide with the labeled agent states.

In some example embodiments, the sample set of recorded electronic communications or snippets may be manually labeled with different state labels (e.g., "fatigued", "nearing fatigue", and "not fatigued") by supervisors based on their observation of the agent and user behaviors at the different points in the electronic communications or snippets. In some example embodiments, the sample set of recorded electronic communications or snippets may be automatically labeled by contact center controller 100 based on initial state classification criteria. For instance, contact center controller 100 may assign a first state label (e.g., "not fatigued") to electronic communications or snippets that are recorded when agents begin their shifts or when the contact volume is low and may assign a second state label (e.g., "fatigued") to electronic communications or snippets that are recorded immediately before agents end their shifts or when the contact volume is high.

Process 400 includes performing (at 404) a behavioral analysis to extract agent behavioral characteristics. The agent behavioral characteristics correspond to different signals or indicators that are associated with the labeled states from the sample set of recorded electronic communications or snippets. For instance, the agent behavioral characteristics may correspond to measurements of the conference participant energy levels, tone, demeanor, informational accuracy, responsiveness, and/or sentiment parameters. The agent behavioral characteristics may be derived based on word usage, speaking rate, speaking duration, voice inflection, pitch, or tone, facial and/or body expressions, etc. The extracted agent behavioral characteristics simplify the training of the state predictive models by producing discrete inputs from the sample set of recorded electronic communications or snippets that may be used to construct the state predictive models.

Process 400 includes determining (at 406) external events that occurred before or at the time of the sample set of recorded electronic communications occurred and that are relevant to the sample set of recorded electronic communications. In some example embodiments, each electronic communication from the sample set of recorded electronic communications may be timestamped or dated to identify when that electronic communication took place. Contact center controller 100 may associate relevant events that transpired at or before the time of an electronic communication to that electronic communication. Relevant events may include events that influence contact volume or agent fatigue. For instance, a contact center for an airline may experience contact volume surges when extreme weather occurs or high profile events are scheduled to take place at a particular location. Similarly, a contact center for consumer goods manufacturer may experience contact volume surges in response to press releases for new products, safety recalls, or position or negative reviews being posted on social media.

Process 400 includes providing (at 408) the extracted agent behavioral characteristics, the relevant external events, and the corresponding or time-matched state labels as training data for one or more neural networks. For instance, contact center controller 100 may provide (at 408) polite, energetic, and accurate answer agent behavioral characteristics that are extracted from a first time in an electronic communication and a "not fatigued" label that is associated with the first time or the end of the first time as a first set of training data for the one or more neural networks, and may provide (at 406) lethargic, rude, and inaccurate answer agent behavioral characteristics that are extracted from a second time in an electronic communication, a particular external event that preceded that electronic communication, and a "fatigued" label that is associated with the second time or the end of the second time as a second set of training data for the one or more neural networks. Other supplemental data that may be provided (at 408) as training data may include the time variables or parameters for when the sample set of recorded electronic communications or snippets were captured in a given day or in a given shift of the participating live agent.

Process 400 includes detecting (at 410) unique combinations of the extracted agent behavioral characteristics, relevant external events, and/or supplemental data that are associated with a single state label or that are associated with one state label by a first threshold amount (e.g., 80% or more of electronic communications or snippets with the same label have the unique combination of the training data) and that are not associated with any other state label by more than a second threshold amount (e.g., 20% or less of electronic communications or snippets with other labels have the unique combination of the training data). For instance, the one or more neural networks perform trend or pattern detection by combining different groups of agent behavioral characteristics and/or relevant external events that are associated with one or more electronic communications or snippets having a common state label, determining a number or percentage of other electronic communications or snippets with the same common state label with the same group of agent behavioral characteristics and/or relevant external events, determining a number or percentage of other electronic communications or snippets with other state labels that also have the same group of agent behavioral characteristics and/or relevant external events, and retaining the groups of agent behavioral characteristics and/or relevant external events that are unique to a single state label (e.g., a single level of fatigue or fatigue classification). The one or more neural network perform the trend or pattern detection to determine which agent behavioral characteristics and which relevant external events have a likelihood of positively or negatively affecting agent state.

Process 400 includes generating (at 412) the state predictive models based on the unique combinations that are detected (at 410) for a single state label. For instance, the vectors of a state predictive model may be defined as a connected set of synapses with each synapse corresponding to a different extracted agent behavioral characteristic or relevant external event, the connected set of synapses representing a particular unique combination of agent behavioral characteristics and/or relevant external events that is associated with a single state label, and the output of the connected set of synapses provides the single state label with or without a percentage or confidence score for that single state label. Each vector of the state predictive model therefore represents a different set of signals or indicators of agent and/or user behaviors, relevant external events, and/or other tracked supplemental data (e.g., time-of-day, time-in-shift, etc.) that collectively identify an agent state or fatigue classification with a high probability.

State monitor 201 may use the state predictive models to determine agent state and/or classify agent fatigue in active electronic communications based on signals or indicators that are extracted in real-time from those active electronic communications. Moreover, state monitor 201 may retrain or refine the state predictive models to add, remove, or modify the state predictive model vectors based on other trends, patterns, or unique combinations that are discovered as more electronic communications are monitored.

Contact center controller 100 may customize the determination of agent state on an individual agent basis based on the state history that is tracked for each agent. For instance, contact center controller 100 may track the state changes that are generated for each agent over a period of time (e.g., fatigue classifications generated for an agent throughout each day for a month) along with a time parameter that identifies when each state change occurred. The time parameter may correspond to a time of day or a relative time value that indicates elapsed time since the start of the agent's shift or a last break. Additionally, contact center controller 100 may track the type of electronic communications that the agent was involved in throughout a day along with the state changes that were generated throughout the day. The type of electronic communication provides insight as to whether the agent was engaged in electronic communications for the same or different topics (e.g., customer complaints, support, outreach, or other electronic communication types) and may be used to determine what effects the different types of electronic communications have on the agent state and/or if repeated fielding of the same electronic communication type has an impact on agent state.

Figure 5:
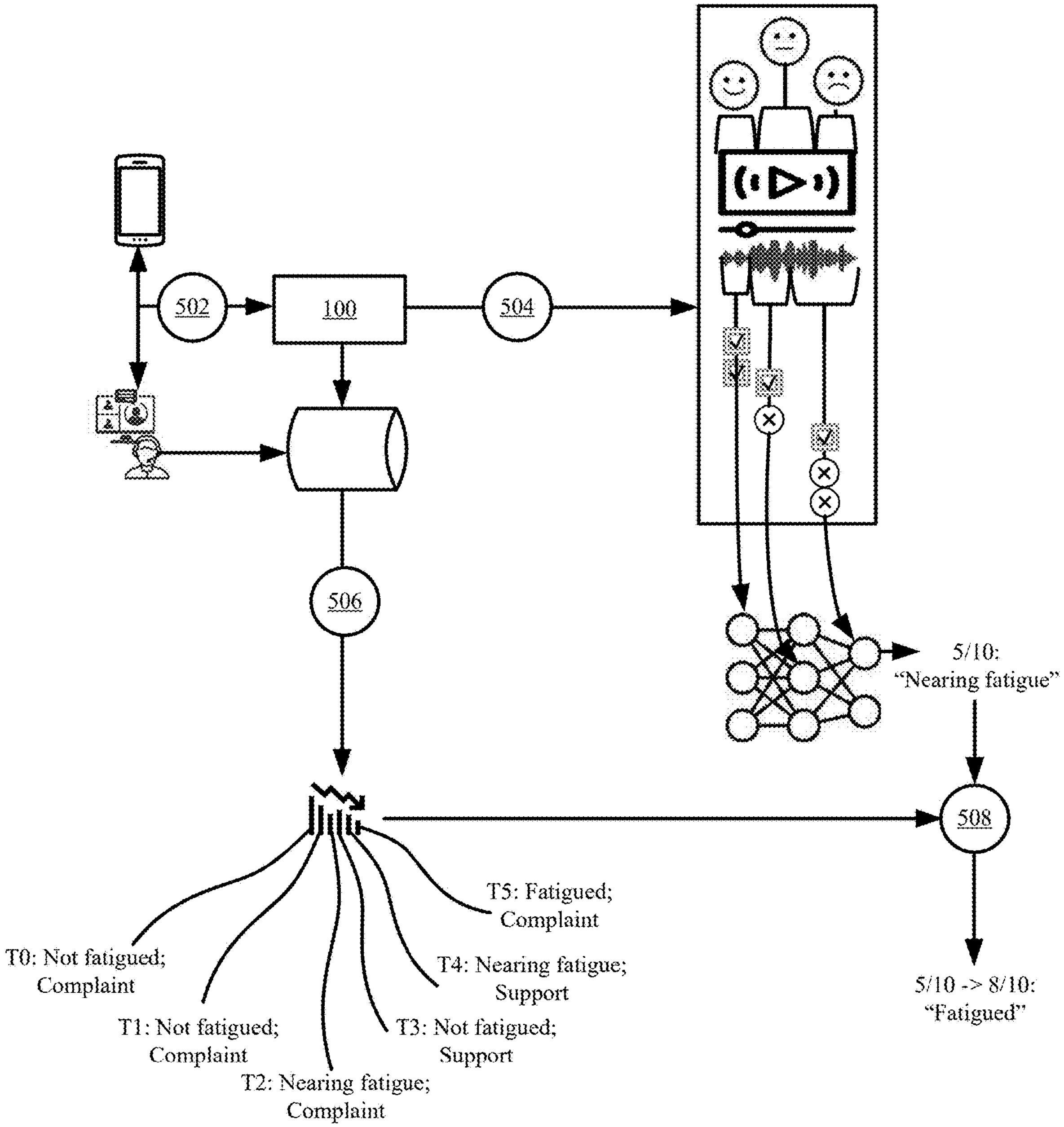
FIG. 5 illustrates an example of customizing the agent state classification based on agent state history in accordance with some embodiments presented herein.

FIG. 5 illustrates an example of customizing the agent state classification based on agent state history in accordance with some embodiments presented herein. Contact center controller 100 monitors (at 502) an active electronic communication between a particular agent and one or more users.

Contact center controller 100 performs (at 504) the behavioral analysis on the audio and/or video streams of the active electronic communication. Contact center controller 100 extracts the agent behavioral characteristics associated with agent fatigue and/or other agent state from the audio and/or video streams of the active electronic communication.

Contact center controller 100 retrieves (at 506) the state history of the particular agent. In some example embodiments, the state history for all agents in a contact center may be stored in a database and accessed or updated based on an identifier associated with the particular agent (e.g., agent name, agent login information, device identifier user by the agent, etc.).

The state history includes the state classifications that were determined for the particular agent from previous electronic communications that the particular agent participated in. The state history may include the state classifications that are tracked over a current shift or day, or may include the state classifications over multiple shifts to record patterns in state changes over time. The state history may include electronic communication identifiers that identify the type of electronic communication that the particular agent participated in when each state classification was generated. The state history may include time parameters that identify discrete or relative times at which each state classification was generated and/or electronic communication type identifiers that identify the topic, subject matter, or nature of the electronic communication that is associated with each fatigue classification.

Contact center controller 100 determines (at 508) the agent's current state by providing the extracted agent behavioral characteristics into the state predictive models and by biasing the output of the state predictive models according the state history of the particular agent. Contact center controller 100 may reference the state history of the particular agent to determine the rate at which different types of electronic communications that the agent received throughout the day and the current time in a shift or since a last break contribute to the particular agent's state. For instance, the state predictive models may output a 5 out of 10 fatigue classification for the particular agent based on the extracted agent behavioral characteristics from the active conference. Contact center controller 100 may increase the fatigue classification in response to determining that the particular agent has repeatedly engaged in the same type of electronic communication throughout the current shift and that the state history of the particular agent indicates an accelerated rate of fatigue when the particular agent repeatedly engages in the same type of electronic communication. Contact center controller 100 may also increase the fatigue classification in response to determining that the particular agent has gone 2 hours since a last break and the fatigue history indicating that the particular agent requires breaks every 2 hours.

Contact center controller 100, by execution of management system 203, controls the electronic communications within a contact center and manages agent state by performing different automated actions based on the real-time identification of each agent state throughout the day. In particular, contact center controller 100 controls the routing of electronic communications across the available set of agents to manage, diversify, temporarily halt, and/or distribute the agent workload. By managing, diversifying, temporarily halting, and/or distributing the agent workload, contact center controller 100 reduces the rate at which the agents fatigue, staggers the breaks to maximize the number of agents that are active at any given time, and temporarily removes agents that have become ineffective and could potentially harm productivity or customer satisfaction. Consequently, user satisfaction and the overall user experience is improved because user interactions are restricted to agents that are not fatigued. Agent satisfaction is also improved as contact center controller 100 prevents agents from becoming overworked, overstressed, or burned out.

Figure 6:
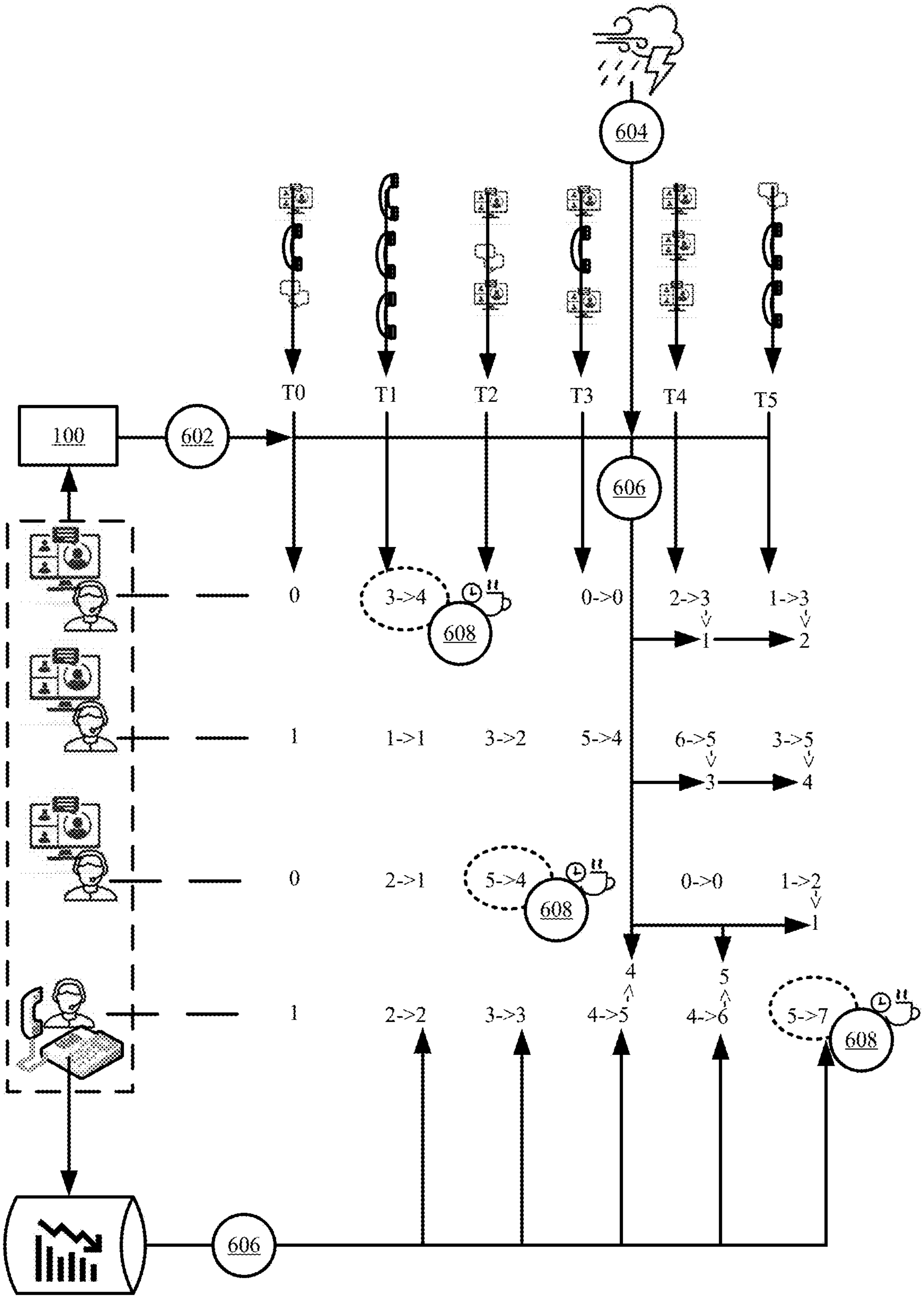
FIG. 6 illustrates an automated electronic communication management example for maximizing agent productivity in accordance with some embodiments presented herein.

FIG. 6 illustrates an automated electronic communication management example for maximizing agent productivity in accordance with some embodiments presented herein. Contact center controller 100 continually monitors and tracks the level of fatigue for a set of active agents in a contact center. Contact center controller 100 determines (at 602) each agent's state or level of fatigue based on the agent behavioral characteristics that are extracted from current and past electronic communications conducted by each agent. Additionally, contact center controller 100 monitors (at 604) external events that occur ahead of agent state changes to determine if and how much those external events impact each agent's state or level of fatigue.

Contact center controller 100 may adjust (at 606) the fatigue levels of each agent based on a tracked fatigue history of each agent and any monitored (at 604) external events that may impact the fatigue levels. For instance, contact center controller 100 may determine that a first set of agents fatigue at a faster rate than a second set of agents, and may increase fatigue levels of the first set of agents relative to the second set of agents. Moreover, contact center controller 100 may determine that a particular external event has occurred that will accelerate agent fatigue going forward until issues created by the particular external event are resolved. Accordingly, contact center controller 100 may adjust (at 606) the fatigue levels to account for the expected fatigue acceleration. Alternatively, contact center controller 100 may determine that the particular external event will increase contact volume for a period of time, and may adjust (at 606) the fatigue levels to raise the threshold at which an agent becomes fatigued. For instance, contact center controller 100 may raise the threshold to reduce the rate at which agents fatigue and to increase the number of available agents for responding to the expected increase in user complains. In other words, contact center controller 100 may raise the threshold to decrease the number of agents that are provided breaks or the length of the breaks in the wake of the external event to maximize the contact center responsiveness and to improve the user experience. Once the effect of the external event subsides, contact center controller 100 may revert the thresholds to their previous values or may adjust the rate at which the agents fatigue to the rates prior to the external event occurring.

Contact center controller 100 provides (at 608) respites to the agents according to their adjusted fatigue levels so as to stagger their breaks and minimize the number of agents that are on break at any given point in time. Providing (at 608) a respite may include not routing any new electronic communications for a period of time to the agent that receives the respite, and routing the new electronic communications to the other live agents that are active and not on break or providing an option for the users associated with the new electronic communications to receive a callback or return electronic communication when a next available agent is available. Contact center controller 100 may also provide a notification or message on the device of the agent receiving the respite. The notification or message alerts the agent to go on break for the period of time.

Other ways by which contact center controller 100 may stagger the agent breaks is by managing the rate at which the agents fatigue. The state history associated with each agent may track different factors that cause an agent to fatigue at different rates. One such factor may be the type of electronic communications that the agent receives. A first set of agents may enjoy conflict resolution and may fatigue at a constant or linear rate when repeatedly dealing with those types of electronic communications. However, a second set of agents may find conflict resolution more stressful and may fatigue at an accelerated rate when repeatedly dealing with those types of electronic communications. Accordingly, contact center controller 100 may route the same conflict resolution electronic communications to the first set of agents and may vary the types of electronic communications that are routed to the second set of agents to allow them to respond to more electronic communications before needing a break.

The automated actions performed as part of the automated conference management preemptively prevent or minimize the number of agents that reach certain states corresponding to specific levels of fatigue. The automated actions are preemptively performed by contact center controller 100 to prevent or minimize harm to the business, negative customer experiences or satisfaction, and/or reduced productivity that are more likely to be caused by fatigued agents than fresh or not fatigued agents. Moreover, agent turnover is reduced as fewer agents reach a burnout state or become dissatisfied when their workloads, stress levels, and/or other causes of fatigue are properly managed by contact center controller 100.

Nevertheless, there may be circumstances beyond the control of contact center controller 100 that lead to one or more agents reaching undesired states of fatigue. For instance, a single angry call, a call that is difficult to resolve, or a series of calls that each lead to a negative disposition despite the best and correct efforts of an agent may cause the agent to become fatigued. In such instance, contact center controller 100 may perform different automated actions that immediately assist or relieve the agent rather than let the agent complete the electronic communication at the fatigued state.

Figure 7:
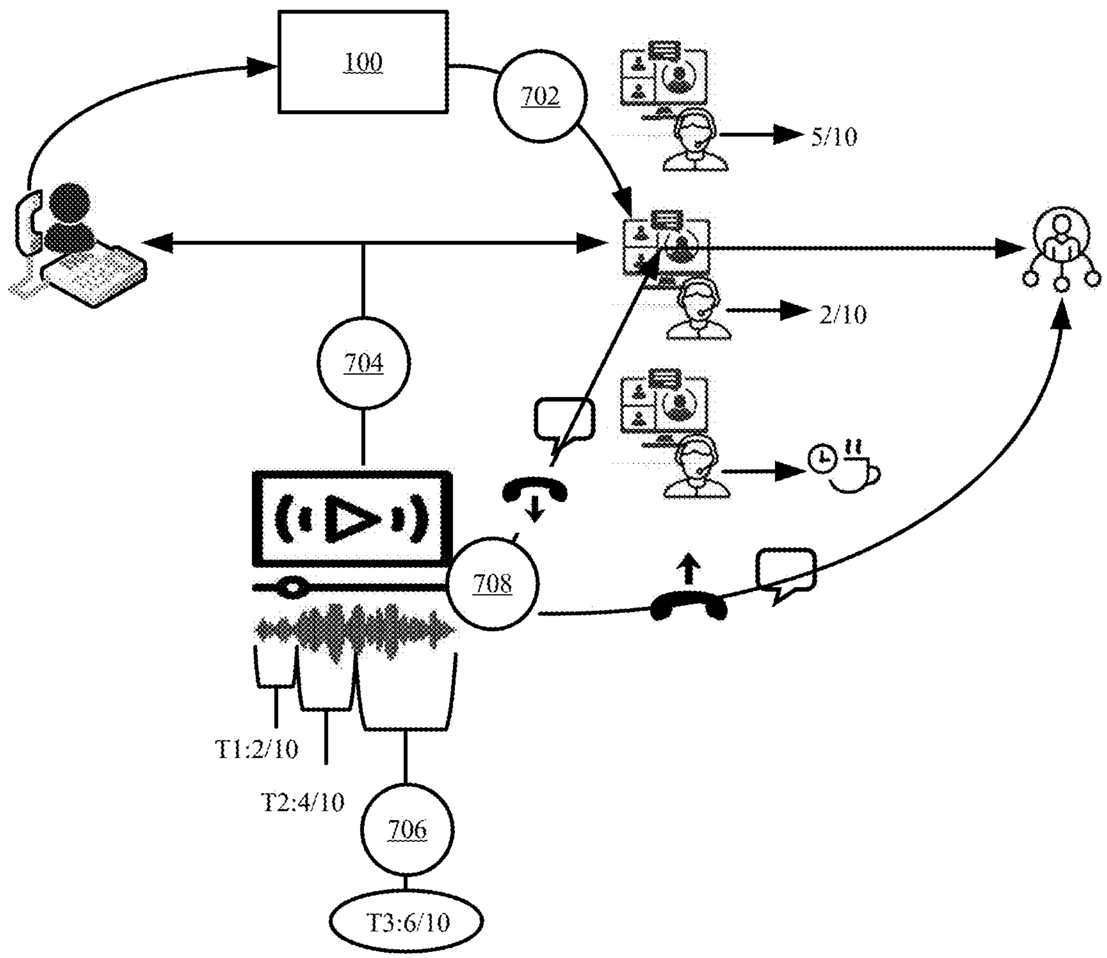
FIG. 7 illustrates an example of an assistive automated action performed during an active conference in accordance with some embodiments presented herein.

FIG. 7 illustrates an example of an assistive automated action performed during an active electronic communication in accordance with some embodiments presented herein. Contact center controller 100 establishes (at 702) an electronic communication between a user device and a device of a particular agent that is available to receive new electronic communications. For instance, contact center controller 100 may determine from the particular agent state that the particular agent is not fatigued and is therefore able to respond to user issues and receive new electronic communications. Establishing (at 702) the electronic communication may include routing an inbound call or contact from the user device to the particular agent device or configuring the particular agent device to call or contact the user device.

Contact center controller 100 tracks (at 704) the state of the particular agent throughout the electronic communication. In particular, contact center controller 100 tracks (at 704) the particular agent's level of fatigue as the electronic communication unfolds.

Contact center controller 100 determines (at 706) that the particular agent reaches a state of fatigue at a particular point in the electronic communication that increases the potential of the particular agent providing ineffective assistance, deviating from best practices, and/or lowering user satisfaction. Contact center controller 100 may be configured to provide immediate assistance to agents at the same state.

Contact center controller 100 relieves (at 708) the particular agent by handing off or handing over the electronic communication. In some example embodiments, contact center controller 100 relieves (at 708) the particular agent by contacting a device of a supervisor or support personnel. Contacting the device of the supervisor or support personnel may include providing an alert that the particular agent is in need of assistance and a summary or transcript of the electronic communication. Additionally, contact center controller 100 may present an alert on the particular agent device to notify the particular agent of the handoff. For instance, contact center controller 100 may present a prompt for the particular agent to read to the other participants of the electronic communication. The prompt may notify the other participants of the handoff. The prompt may read "Let me transfer you to my supervisor to better assist you." Contact center controller 100 may then connect the device of the supervisor or support personnel to the electronic communication and may disconnect the particular agent device after the supervisor or support personnel have introduced themselves. In some other example embodiments, contact center controller 100 relieves (at 708) the particular agent by handing off or handing over the electronic communication to a bot. The handover may occur with the same notification being presented on the particular agent device but with the bot taking over instead of a human.

The bot may emulate a live agent. Prior to performing the handoff, contact center controller 100 may instantiate the bot and may train the bot based on a recording of the electronic communication to the current point in time. The bot receives a record of the interactions between the particular agent and other participants of the electronic communication, identifies the issue, retrieves modeled best practices and/or behaviors for resolving the identified issue, and seamlessly takes over for the particular agent. In some such example embodiments, the instantiated bot may be previously trained based on examples of best practices or exemplary electronic communications of the same type.

In some example embodiments, contact center controller 100, by execution of scheduler 207, may leverage the bots to dynamically scale the contact center in a manner that reduces live agent fatigue. For instance, contact center controller 100 may use the bots to perform repetitive or mundane tasks on behalf of the live agent. The bots therefore free the live agents from the repetitive or mundane tasks and preserve more agent time for other issues that the bots may be unable to perform effectively. Alternatively, contact center controller 100 may use the bots to scale the contact center in order to handle an unplanned increase in contact volume. Specifically, the bots may operate in conjunction with the live agents to assist the live agents when the contact volume exceeds the volume that can be handled by the live agents without causing excess stress or fatigue on the agents and/or without negatively impacting user satisfaction (e.g., excessive hold times, limited time with agents, etc.).

Figure 8:
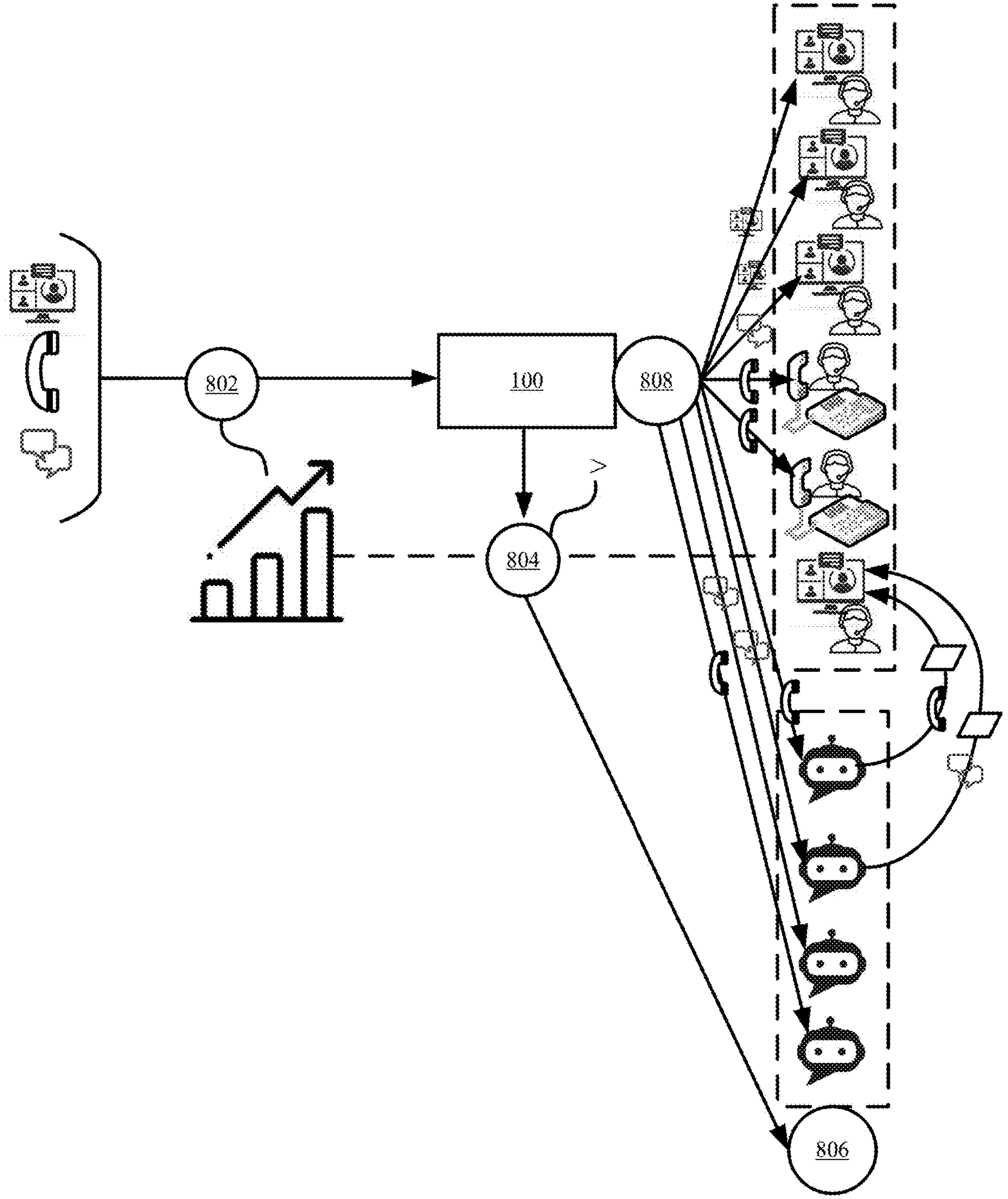
FIG. 8 illustrates an example of dynamically scaling a contact center to minimize agent fatigue in accordance with some embodiments presented herein.

FIG. 8 illustrates an example of dynamically scaling a contact center to minimize agent fatigue in accordance with some embodiments presented herein.

Contact center controller 100 detects (at 802) an external event that is associated with an expected surge in contact volume. For instance, a future weather event (e.g., hurricane making landfall) may result in flight cancellations. Customers affected by the flight cancellations may contact the contact center to rebook on the next available flights.

Contact center controller 100 determines (at 804) that the expected surge in contact volume will exceed the current or schedule capacity of the contact center and that the live agents will be unable to resolve the customer issues in an acceptable amount of time or without accelerated fatigue. Accordingly, contact center controller 100 instantiates (at 806) a number of bots that are trained to handle the customer issues (e.g., flight cancellations and rebooking on next available flights) associated with the expected contact volume. For instance, the contact volume is expected to spike for a Uniform Resource Locator (URL) or telephone number where issues (e.g., flight cancellation support) caused by or associated with the detected (at 802) external event are received. Accordingly, in anticipation of the expected spike, contact center controller 100 instantiates (at 806) the bots by programming or configuring the bots with best practices for resolving the issues caused by or associated with the detected (at 802) external event and/or for collecting relevant information from users prior to connecting the users with a live agent.

Contact center controller 100 routes (at 808) the electronic communications associated with the surge in contact volume between the available live agents and the instantiated bots. In some example embodiments, contact center controller 100 routes (at 808) the electronic communications to the instantiated bots for initial information acquisition, and then transfers the electronic communications with the acquired customer information to the live agents. For instance, the bots may ask the customers which flight they were on that was canceled, the final destination of the canceled flight, and their current location. Based on the provided information, the bots may lookup alternative flights from the customer's current location to the final destination. The bots may present the alternative flights to the customer, and if the customer selects one of the alternative flights, the bots may book the selected alternative flight without including a live agent in the process. If the customer does not select one of the alternative flights, contact center controller 100 may transfer the call or contact from the bot to a live agent for additional assistance. Alternatively, contact center controller 100 may transfer the call or contact with the alternative flight information to a live agent who may then assist the customer in booking a new flight.

Contact center controller 100 may automate the workflow management and scheduling of the contact center to minimize the need for bots and/or scaling of the contact center. For instance, contact center controller 100 may track the effectiveness and fatigue rate of each agent, the historic contact volume for upcoming days, and the external events that may affect the historic contact volume. Contact center controller 100, via execution of scheduler 207, may allocate an optimal mix of live agents for handling a predicted contact volume for the upcoming days that does not leave the contact center overstaffed or understaffed and that maximizes the number of live agents that are active at any given time by scheduling agents with staggered breaks.

Figure 9:
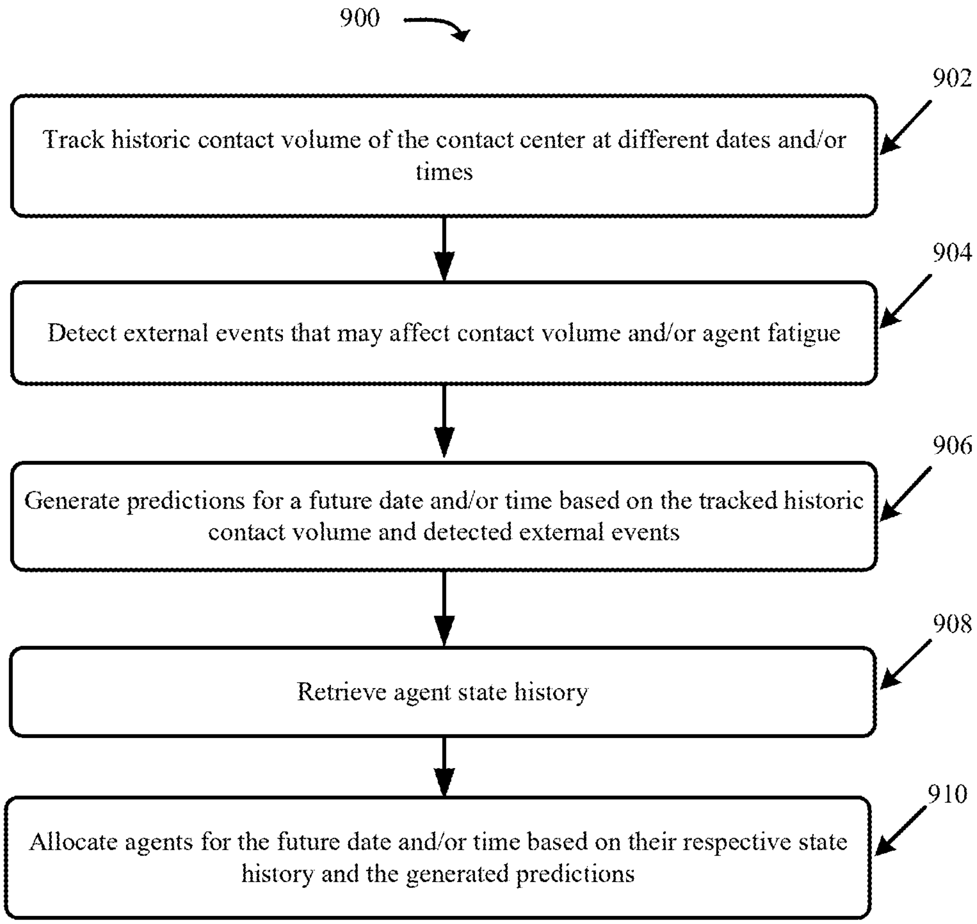
FIG. 9 presents a process for performing predicted contact center resource allocation in accordance with some embodiments presented herein.

FIG. 9 presents a process 900 for performing predicted contact center resource allocation in accordance with some embodiments presented herein. Process 900 is implemented by contact center controller 100 and/or by scheduler 207 of contact center controller 100.

Process 900 includes tracking (at 902) historic contact volume of the contact center at different dates and/or times. For instance, contact center controller 100 may log the number of inbound communications that are received every week of the year, on each Monday, every day of the year, etc.

Process 900 includes detecting (at 904) external events that may affect contact volume or agent state. The external events may be crowdsourced from different news, weather, social media, and/or other data sources. For instance, the contact volume for a contact center associated with a hotel or lodging provider in a particular geographic region may be affected by weather, concerts, conventions, and/or other live events, whereas the contact volume for a device manufacturer may be affected by news of software or hardware upgrades, operational bugs, and/or safety issues. The relevant external events and their effect on contact volume or agent state may be also be tracked based on past occurrences of different events and changes in contact volume or agent state occurring immediately after or within a time window of the event. In some example embodiments, the effect of each external event on the contact volume may be quantified based on the average change detected in the past occurrences of each external event. In some example embodiments, the effect of each external event on agent state may be determined based on an increasing or decreasing rate at which agents fatigue after the external event has occurred.

Process 900 includes generating (at 906) predictions for a future date and/or time based on the tracked (at 902) historic contact volume and detected (at 904) external events. The predictions may forecast contact volume based on the tracked (at 902) historic contact volume and detected (at 904) external events. The predictions may also adjust thresholds or rates at which different agents transition between different states based on the tracked (at 902) historic contact volume and detected (at 904) external events. For instance, if no external events are detected (at 904), then contact center controller 100 may predict the contact volume to be about equal to the tracked (at 902) historic contact volume and agents to fatigue at modeled rates. However, if one or more external events are detected (at 904), contact center controller 100 may increase or decrease the historic contact volume according to an expected impact of the one or more external events and/or may increase or decrease the rate at which the agents fatigue according to the expected impact of the one or more external events. For example, if a hurricane is forecasted to make landfall on a future date and the contact center provides assistance for cancelled flights, contact center controller 100 may determine the number of flights coming into and leaving airports likely to be affected by the hurricane, and may predict the contact volume based on the number of passengers booked on those flights. As another example, contact center controller 100 may track different thresholds for changing agent state after well-known influencers post positive reviews about company products on social media. Specifically, contact center controller 100 may track an increase in call volume that results in higher sales conversions and higher commissions for the live agents. In this case, the external event (e.g., social media influencer posting a positive review) results in a reduced rate of agent fatigue despite the agents having to handle more of the same type of electronic communications. Accordingly, contact center controller 100 may predict that the agents need fewer breaks or shorter breaks to operate at an optimal level.

Process 900 includes retrieving (at 908) agent state history. The agent state history may track the number of electronic communications that each agent completes in a shift, the rate at which the agent transitions between different states of fatigue in response to different causes, and/or the number of breaks that the agent takes or is given during each shift. In some example embodiments, the agent state history also tracks different impacts that different external events have on the number of electronic communications that each agent completes in a shift, the rate at which the agent transitions between different states of fatigue in response to different external events, and/or the number of breaks that the agent takes or is given during each shift. In other words, the agent state history may separately track agent performance and state transitions across different shifts affected by different external events.

Process 900 includes allocating (at 910) agents for the future date and/or time based on their respective state history and the generated (at 906) predictions. Allocating (at 910) the agents may include selecting a set of agents from a pool of available agents that transition between different states of fatigue at different rates or times based on their state history and that include a sufficient number of agents for responding to the predicted (at 906) volume, and scheduling the selected set of agents for one or more shifts at the future date and/or time. Moreover, contact center controller 100 may schedule low-performing agents (e.g., agents that fatigue at accelerated rates) on days where the contact volume is low or distributed throughout the shift, and may schedule high-performing agents on days where the contact volume is high or concentrated in a particular shift. The differentiation between the low-performing agents and high-performing agent and/or other agent classification may be based on different agent performance tracked in response to different external events occurring, different contact volume experienced at the contact center, different types of electronic communication being routed to the agents, and/or other monitoring of the agents by contact center controller 100.

Contact center controller 100, by execution of process 900, automatically manages workflows and/or resources of the contact center to avoid being understaffed or overstaffed across different shifts where the contact volume may dynamically change due to external events. Additionally, contact center controller 100 is able to dynamically scale the contact center resources if the allocation of agents is insufficient or the predicted contact volume is incorrect by activating the bots to receive and respond to the excess contact volume.

In some example embodiments, contact center controller 100 may use the data that is compiled on the agents for performance evaluation. Contact center controller 100 may leverage the compiled data to determine which agents require additional training and/or which agents should receive bonuses or financial rewards for their services. For instance, contact center controller 100 may reward agents that require fewer breaks and are able to handle a large number of difficult calls or contacts in a shift. The performance evaluation may include generating reports that specify the fatigue history, break frequency, and/or fatigue rate for supervisors.

The embodiments presented above are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the above descriptions are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things ("IoT") devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and nonvolatile, removable and non-removable media implemented in any method or technology for storage of information such as computer-readable instructions, data structures, program modules, or other data. Computer storage media can include, but is not limited to, random access memory ("RAM"), read only memory ("ROM"), electrically erasable programmable ROM ("EEPROM"), flash memory, or other memory technology, compact disk ROM ("CD-ROM"), digital versatile disks ("DVDs") or other optical storage, solid state drives, hard drives, hybrid drive, or any other medium that can be used to store the desired information and that can be accessed to retrieve that information.

It is appreciated that the presented systems and methods can be implemented in a variety of architectures and configurations. For example, the systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

The invention claimed is:

1. A computer-implemented method for automated management of a plurality of electronic communications, the computer-implemented method comprising:

routing the plurality of electronic communications to a plurality of agents;

monitoring interactions between the plurality of agents and a plurality of users participating in the plurality of electronic communications, wherein monitoring the interactions comprises measuring different fatigue signals for the plurality of agents based on a speaking tone, etiquette, informational accuracy, and patience of the plurality of agents as determined through analyzed speech of the plurality of agents;

determining a state associated with each particular agent of the plurality of agents based on the different fatigue signals measured from speech patterns of the particular agent in different electronic communications involving the particular agent; and routing new electronic communications away from a first agent of the plurality of agents in response to determining a first state for the first agent.

2. The computer-implemented method of claim 1, wherein routing the new electronic communications away from the first agent comprises:

routing the new electronic communications to other agents of the plurality of agents in response to determining a second state for the other agents and the second state being associated with less fatigue than the first state.

3. The computer-implemented method of claim 1, further comprising:

connecting a second agent of the plurality of agents to an active electronic communication involving a third agent of the plurality of agents in response to determining a second state for the third agent that exceeds a threshold, wherein connecting the second agent comprises adding the second agent to the active electronic communication between the third agent and at least one user of the plurality of users.

4. The computer-implemented method of claim 3, further comprising:

providing a notification on a device of the third agent prior to connecting the second agent to the active electronic communication; and disconnecting the third agent from the active electronic communication after connecting the second agent to the active electronic communication.

5. The computer-implemented method of claim 1, further comprising:

activating a bot in response to determining a second state for a second agent of the plurality of agents that is participating in an active electronic communication of the plurality of electronic communications; and transferring the active electronic communication from the second agent to the bot, wherein said transferring comprises responding to audio or textual inquiries of one or more users in the active electronic communication with audio or textual responses that are generated by the bot.

6. The computer-implemented method of claim 1, wherein determining the state comprises:

deriving a measure of fatigue for each agent of the plurality of agents based on modeled associations between different audio and visual indicators of fatigue and different classifications of fatigue.

7. The computer-implemented method of claim 1, wherein determining the state comprises:

tracking changes to the state of the first agent while the first agent participates in a last routed electronic communication involving the first agent.

8. The computer-implemented method of claim 7, further comprising:

transferring the last routed electronic communication from the first agent to another agent or bot in response to the state of the first agent changing from the first state to a second state while the first agent participates in the last routed electronic communication.

9. The computer-implemented method of claim 1, further comprising:

tracking different rates at which states of different agents from the plurality of agents change based on state changes occurring while determining the state associated with each particular agent; and scheduling different times at which the plurality of agents are on a break based on the different rates at which the states of the different agents change.

10. The computer-implemented method of claim 1, further comprising:

detecting one or more external events;

predicting a contact volume at a future shift based on the one or more external events; and selecting a set of agents from the plurality of agents for the future shift to include a number of agents able to respond to the contact volume without reaching a particular state.

11. The computer-implemented method of claim 1, further comprising:

detecting one or more external events;

predicting an increase in contact volume in response to the one or more external events; and scaling resources according to the contact volume, wherein scaling the resources comprises activating a plurality of bots to supplement the plurality of agents.

12. The computer-implemented method of claim 11, further comprising:

routing electronic communications associated with the increase in the contact volume to the plurality of bots.

13. A system for automated management of a plurality of electronic communications, the system comprising:

one or more hardware processors configured to:

route the plurality of electronic communications to a plurality of agents;

monitor interactions between the plurality of agents and a plurality of users participating in the plurality of electronic communications, wherein monitoring the interactions comprises measuring different fatigue signals for the plurality of agents based on a speaking tone, etiquette, informational accuracy, and patience of the plurality of agents as determined through analyzed speech of the plurality of agents;

determine a state associated with each particular agent of the plurality of agents based on the different fatigue signals measured from speech patterns of the particular agent in different electronic communications involving the particular agent; and route new electronic communications away from a first agent of the plurality of agents in response to determining a first state for the first agent.

14. The system of claim 13, wherein routing the new electronic communications away from the first agent comprises:

routing the new electronic communications to other agents of the plurality of agents in response to determining a second state for the other agents and the second state being associated with less fatigue than the first state.

15. The system of claim 13, wherein the one or more hardware processors are further configured to:

connect a second agent of the plurality of agents to an active electronic communication involving a third agent of the plurality of agents in response to determining a second state for the third agent that exceeds a threshold, wherein connecting the second agent comprises adding the second agent to the active electronic communication between the third agent and at least one user of the plurality of users.

16. The system of claim 15, wherein the one or more hardware processors are further configured to:

provide a notification on a device of the third agent prior to connecting the second agent to the active electronic communication; and disconnect the third agent from the active electronic communication after connecting the second agent to the active electronic communication.

17. The system of claim 13, wherein the one or more hardware processors are further configured to:

activate a bot in response to determining a second state for a second agent of the plurality of agents that is participating in an active electronic communication of the plurality of electronic communications; and transfer the active electronic communication from the second agent to the bot, wherein said transferring comprises responding to audio or textual inquiries of one or more users in the active electronic communication with audio or textual responses that are generated by the bot.

18. The system of claim 13, wherein determining the state comprises:

deriving a measure of fatigue for each agent of the plurality of agents based on modeled associations between different audio and visual indicators of fatigue and different classifications of fatigue.

19. A non-transitory computer-readable medium storing program instructions that, when executed by one or more hardware processors of a contact center controller, cause the contact center controller to perform operations comprising:

routing a plurality of electronic communications to a plurality of agents;

monitoring interactions between the plurality of agents and a plurality of users participating in the plurality of electronic communications, wherein monitoring the interactions comprises measuring different fatigue signals for the plurality of agents based on a speaking tone, etiquette, informational accuracy, and patience of the plurality of agents as determined through analyzed speech of the plurality of agents;

determining a state associated with each particular agent of the plurality of agents based on the different fatigue signals measured from speech patterns of the particular agent in different electronic communications involving the particular agent; and routing new electronic communications away from a first agent of the plurality of agents in response to determining a first state for the first agent.

20. The computer-implemented method of claim 1, further comprising:

determining a first electronic communication type that is routed to a second agent of the plurality of agents;

determining a second state for the second agent based on the same first electronic communication type being routed to the second agent; and routing electronic communications of a second electronic communication type to the second agent in response to the second state being associated with an accelerated rate of fatigue and the routing of the second electronic communication type reducing the rate of fatigue for the second agent.

* * * * *